United States Patent
Wang et al.

(10) Patent No.: US 9,722,505 B2
(45) Date of Patent: Aug. 1, 2017

(54) WIND POWER CONVERSION SYSTEM WITH PLURAL FIRST CONVERTING CIRCUITS AND A SECOND CONVERTING CIRCUIT

(71) Applicant: DELTA ELECTRONICS, INC., Taoyuan (TW)

(72) Inventors: Changyong Wang, Shanghai (CN); Li Cai, Shanghai (CN); Yansong Lu, Shanghai (CN); Fei Lu, Shanghai (CN)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 14/941,122

(22) Filed: Nov. 13, 2015

(65) Prior Publication Data

US 2016/0211763 A1    Jul. 21, 2016

(30) Foreign Application Priority Data

Jan. 19, 2015  (CN) .......................... 2015 1 0026057

(51) Int. Cl.
*H02M 5/458* (2006.01)
*H02J 3/38* (2006.01)
(Continued)

(52) U.S. Cl.
CPC ............ *H02M 5/458* (2013.01); *H02J 3/386* (2013.01); *H02M 1/32* (2013.01); *H02M 5/4585* (2013.01);
(Continued)

(58) Field of Classification Search
CPC . H02M 2001/0032; H02M 2001/0074; H02M 5/275; H02M 5/293; H02M 5/297;
(Continued)

(56) References Cited

U.S. PATENT DOCUMENTS 5,933,339 A * 8/1999 Duba ...................... H02M 7/49
                                                    363/41
6,229,722 B1    5/2001 Ichikawa et al.
(Continued)

FOREIGN PATENT DOCUMENTS

CN    101465606 A    6/2009
CN    101621204 A    1/2010
(Continued)

*Primary Examiner* — Fred E Finch, III
(74) *Attorney, Agent, or Firm* — Kirton McConkie; Evan R. Witt

(57) ABSTRACT

A wind power conversion system includes plural first converting circuits and a second converting circuit. The plural first converting circuits perform a power converting task, and include respective first generator-side terminals and respective first network-side terminals. The first generator-side terminals are electrically connected with a wind power generator. The first network-side terminals are electrically connected with corresponding secondary windings of an isolating transformer. The second converting circuit includes plural second generator-side terminals and a second network-side terminal. The second network-side terminal is electrically connected with the corresponding secondary winding of plural secondary windings of the isolating transformer. The second generator-side terminals are serially connected with the corresponding first generator-side terminals of the first converting circuits. When the second converting circuit is enabled, the power converting task of the plural first converting circuits is shared by the second converting circuit.

20 Claims, 13 Drawing Sheets

(51) Int. Cl.
*H02M 7/25* (2006.01)
*H02M 1/32* (2007.01)
*H02M 7/49* (2007.01)
*H02M 1/00* (2006.01)

(52) U.S. Cl.
CPC .............. *H02M 7/25* (2013.01); *H02M 7/49* (2013.01); *H02M 2001/0032* (2013.01); *H02M 2001/0074* (2013.01); *Y02B 70/16* (2013.01); *Y02E 10/763* (2013.01)

(58) Field of Classification Search
CPC .... H02M 5/453; H02M 5/458; H02M 5/4585; H02M 7/217; H02M 7/219; H02M 7/25; H02M 7/49; H02J 3/386
See application file for complete search history.

(56) References Cited

U.S. PATENT DOCUMENTS

| | | | |
|---|---|---|---|
| 6,320,767 B1 | 11/2001 | Shimoura et al. | |
| 6,377,478 B1* | 4/2002 | Morishita | H02P 23/06 363/34 |
| 7,430,132 B2 | 9/2008 | Morishita | H02M 7/49 363/34 |
| 7,535,738 B2* | 5/2009 | Wei | H02M 5/458 363/34 |
| 7,679,941 B2* | 3/2010 | Raju | H02M 7/217 363/37 |
| 7,787,270 B2* | 8/2010 | NadimpalliRaju | H02J 4/00 363/37 |
| 7,830,687 B2* | 11/2010 | Du | H02M 7/49 307/45 |
| 8,198,742 B2 | 6/2012 | Jorgensen et al. | |
| 8,248,828 B2* | 8/2012 | Morishita | H02M 7/10 363/137 |
| 8,644,037 B2* | 2/2014 | Raju | H02M 5/271 363/37 |
| 9,007,789 B2* | 4/2015 | Na | H02M 7/487 363/132 |
| 2011/0134574 A1 | 6/2011 | Ritter | |
| 2012/0099353 A1* | 4/2012 | Azuma | H02M 7/49 363/71 |
| 2013/0070489 A1* | 3/2013 | Zhang | H02M 5/45 363/36 |
| 2014/0085956 A1* | 3/2014 | Koyano | H02M 5/293 363/156 |

FOREIGN PATENT DOCUMENTS

| | | |
|---|---|---|
| CN | 101860231 A | 10/2010 |
| CN | 101969201 A | 2/2011 |
| CN | 201946995 U | 8/2011 |
| CN | 103337871 A | 1/2015 |
| TW | 201332257 A | 8/2013 |

* cited by examiner

WIND POWER CONVERSION SYSTEM WITH PLURAL FIRST CONVERTING CIRCUITS AND A SECOND CONVERTING CIRCUIT

FIELD OF THE INVENTION

The present invention relates to a wind power conversion system, and more particularly to a wind power conversion system that is easily controlled and cost-effective.

BACKGROUND OF THE INVENTION

Nowadays, the energy crisis problem becomes more serious. With increasing environmental consciousness, there are growing demands on renewable energy. For example, solar energy and wind power are the well-known power sources of the renewable energy. In the conventional renewable power generation system, the frequency and the amplitude of the AC power outputted by the power generator are different from the frequency and the amplitude of the AC power network. Consequently, a converting circuit is required to convert the AC power outputted by the power generator. By the converting circuit, the frequency and the amplitude of the AC power outputted by the power generator are identical to those of the AC power of the AC power network. Then, the converted AC power is transmitted to the AC power network through an isolating transformer. As a consequence, the purpose of the grid connected power generation can be achieved.

For example, the wind power conversion system operated in the medium voltage levels (e.g. 1 KV~10 KV) usually has the following circuitry configurations. The first type is a cascade circuitry configuration of plural power components. The second type is a multi-level (e.g. three-level or more than three-level) circuitry configuration of plural serially-connected power components with lower voltage withstanding capacity (e.g. 1.7 KV). The third type is a multi-level (e.g. two-level or more than two-level) circuitry configuration of plural serially connected power components with higher voltage withstanding capacity (e.g. 3.3 KV, 4.5 KV or 6 KV).

The first type wind power conversion system comprises plural converting circuits (e.g. at least six converting circuits) in cascade connection. For complying with plural independent DC bus lines in the plural converting circuits, the isolating transformer between the AC power network and the wind power conversion system has plural secondary windings (e.g. at least six secondary windings) to be electrically connected with the plural converting circuits. Under this circumstance, the overall cost associated with the factory or instrument is high. Although the second type wind power conversion system comprises plural serially-connected power components (e.g. switch elements) with lower voltage withstanding capacity, more power components are required to produce the multi-level circuitry configuration. Consequently, the method of controlling the power components is more complicated. Moreover, since more power components are employed, the fabricating cost is high. The two-level circuitry configuration of the third type wind power conversion system uses less power components. However, since the power components have higher voltage withstanding capacity, the fabricating cost of the third type wind power conversion system is increased due to the increased cost of using the power components having higher voltage withstanding capacity.

Therefore, there is a need of providing an improved wind power conversion system in order to overcome the above drawbacks.

SUMMARY OF THE INVENTION

An object of the present invention provides a wind power conversion system. The wind power conversion system comprises plural first converting circuits and a second converting circuit. The plural second generator-side terminals of the second converting circuit are electrically connected with the corresponding first generator-side terminals of the plural first converting circuits in series. The second network-side terminal of the second converting circuit is electrically connected with the corresponding secondary winding of the plural secondary windings of an isolating transformer. By means of the circuitry configuration of the wind power conversion system, the number of the secondary windings of the isolating transformer is reduced. Moreover, since the power converting task of the plural first converting circuits is shared by the second converting circuit, the voltage stress applied to the plural first converting circuits will be reduced. Consequently, the power components with lower voltage-withstanding capacity may be used in the wind power conversion system in order to control the wind power generator at the medium voltage levels.

Another object of the present invention provides a wind power conversion system. The second converting circuit is selectively operated in a crowbar mode or a non-crowbar mode according to the result of comparing the phase voltage of each phase winding of the wind power generator with the maximum output voltage of the corresponding first generator-side terminal of the first converting circuit. When the second converting circuit is operated in the crowbar mode, the second converting circuit is disabled, so that the power consumption of the wind power conversion system is reduced. When the second converting circuit is operated in the non-crowbar mode, the power converting task of the plural first converting circuits is shared by the second converting circuit.

A further object of the present invention provides a wind power conversion system. The first generator-side converters of the plural first converting circuits and the second generator-side converter of the second converting circuit may be controlled by a sinusoidal pulse width modulation (SPWM) method based on a carrier phase-shifting technique. Consequently, the transient voltage response and the harmonic voltages at the first generator-side terminals of the first converting circuit and the second generator-side terminals of the second converting circuit will be minimized.

In accordance with an aspect of the present invention, there is provided a wind power conversion system. The wind power conversion system is electrically connected between a wind power generator and an isolating transformer. The wind power conversion system includes plural first converting circuits and a second converting circuit. The plural first converting circuits perform a power converting task, and include respective first generator-side terminals and respective first network-side terminals. The first generator-side terminals are electrically connected with the wind power generator. The first network-side terminals are electrically connected with corresponding secondary windings of plural secondary windings of the isolating transformer. The second converting circuit includes plural second generator-side terminals and a second network-side terminal. The second network-side terminal is electrically connected with the corresponding secondary winding of plural secondary windings of the isolating transformer. The second generator-side terminals are serially connected with the corresponding first generator-side terminals of the first converting circuits and electrically connected with the wind power generator through the first converting circuits. The second converting circuit is selectively enabled or disabled. When the second converting circuit is enabled, the power converting task of the plural first converting circuits is shared by the second converting circuit.

The above contents of the present invention will become more readily apparent to those ordinarily skilled in the art after reviewing the following detailed description and accompanying drawings.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
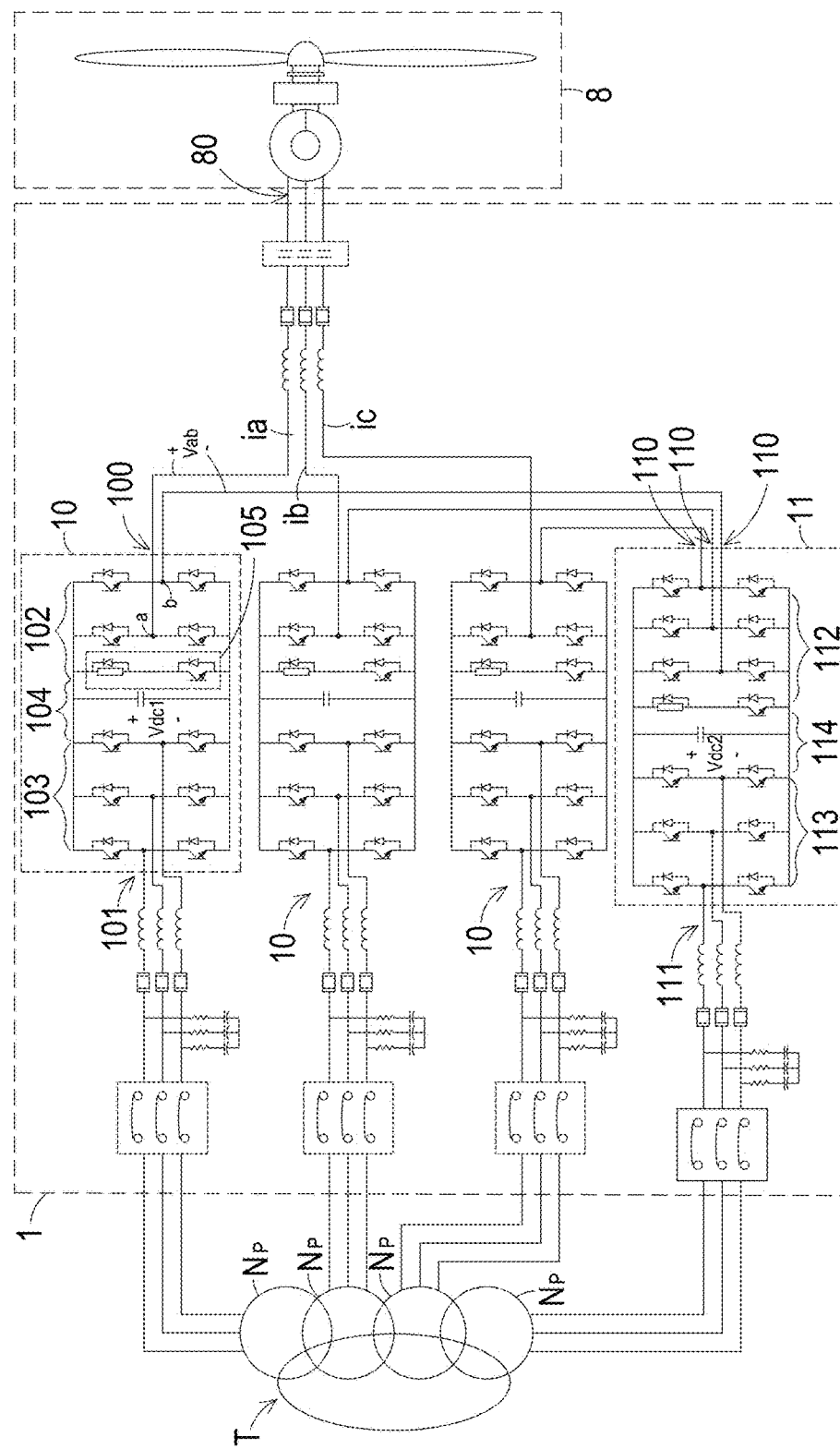
FIG. 1 is a schematic circuit diagram of a wind power conversion system according to a first embodiment of the present invention.

FIG. 1 is a schematic circuit diagram of a wind power conversion system according to a first embodiment of the present invention. As shown in FIG. 1, the wind power conversion system 1 is electrically connected between a wind power generator 8 and an isolating transformer T. A primary side of the isolating transformer T is electrically connected with an AC power network. In this embodiment, the AC power from the wind power generator 8 may be converted by the wind power conversion system 1 and then transmitted to the AC power network through the isolating transformer T. Optionally, the AC power received by the isolating transformer T may be converted by the wind power conversion system 1 and then transmitted to the wind power generator 8. In other words, the wind power conversion system 1 may convert and transmit the electric energy in a single direction or bilateral directions.

In this embodiment, the voltage levels of the wind power generator 8 and the AC power network are medium voltage levels, for example 1 KV~10 KV.

As shown in FIG. 1, the wind power conversion system 1 comprises plural first converting circuits 10 and a second converting circuit 11. A first generator-side terminal 100 of each first converting circuit 10 is electrically connected with a power transmission terminal 80 of the wind power generator 8. A first network-side terminal 101 of each first converting circuit 10 is electrically connected with the corresponding secondary winding Np of the plural secondary windings Np of the isolating transformer T. The AC power from the wind power generator 8 is converted by each first converting circuit 10 and then transmitted to the AC power network through the isolating transformer T. Optionally, the AC power received by the isolating transformer T may be converted by each first converting circuit 10 and then transmitted to the wind power generator 8.

The second converting circuit 11 comprises plural second generator-side terminals 110. The plural second generator-side terminals 110 are electrically connected with the corresponding first generator-side terminals 100 of the plural first converting circuits 10 in series. That is, the plurality of second generator-side terminals 110 may correspond to the plurality of the first converting circuits 10 in a one-to-one ratio. Moreover, the plural second generator-side terminals 110 are electrically connected with the corresponding phase windings of the power transmission terminal 80 of the wind power generator 8 through the corresponding first converting circuits 10. A second network-side terminal 111 of the second converting circuit 11 is electrically connected with the corresponding secondary winding Np of the plural secondary windings Np of the isolating transformer T. The second converting circuit 11 is selectively enabled or disabled. When the second converting circuit 11 is enabled, the AC power from the wind power generator 8 is converted by the second converting circuit 11 and then transmitted to the AC power network through the isolating transformer T. Optionally, the AC power received by the isolating transformer T may be converted by the second converting circuit 11 and then transmitted to the wind power generator 8. In other words, when the second converting circuit 11 is enabled, the power converting task of the plural first converting circuits 10 is shared by the second converting circuit 11. Consequently, the voltage stress applied to the plural first converting circuits 10 will be reduced.

In accordance with the present invention, the wind power generator 8 is a (3N)-phase wind power generator, wherein N is a natural number. In this embodiment, the wind power generator 8 is a three-phase wind power generator. Consequently, the power transmission terminal 80 of the wind power generator 8 comprises three phase windings. The three phase winding have respective phase voltages. The first generator-side terminals 100 of the first converting circuits 10 are electrically connected with the corresponding phase windings of the wind power generator 8. Correspondingly, the wind power conversion system 1 comprises 3N first converting circuits 10. In this embodiment, the wind power conversion system 1 comprises three first converting circuits 10. The number of the secondary windings Np of the isolating transformer T is equal to the total number of the first converting circuits 10 and the second converting circuit 11. Since the wind power conversion system 1 of FIG. 1 comprises three first converting circuits 10 and one second converting circuit 11, the isolating transformer T has four secondary windings Np.

Moreover, each first converting circuit 10 is a three/single phase converting circuit. In this embodiment, each first converting circuit 10 comprises a first generator-side converter 102, a first network-side converter 103 and a first DC bus storage unit 104. The first generator-side converter 102 has a first AC side and a first DC side. The first AC side is electrically connected with the first generator-side terminal 100 of the first converting circuit 10 and electrically connected with the wind power generator 8 through the first generator-side terminal 100. The first generator-side converter 102 is controlled by a pulse width modulation (PWM) method. Moreover, the first AC side is served as the first generator-side terminal 100. The first network-side converter 103 has a second AC side and a second DC side. The second AC side is electrically connected with the corresponding secondary winding Np of the plural secondary windings Np of the isolating transformer T. The second AC side is served as the first network-side terminal 101. Moreover, the first network-side converter 103 is also controlled by the PWM method. In this embodiment, the first DC bus storage unit 104 comprises at least one bus capacitor. The first DC bus storage unit 104 is electrically connected between the first DC side of the first generator-side converter 102 and the second DC side of the first network-side converter 103. Moreover, the first DC bus storage unit 104 is used for storing electric energy, so that the voltage difference across the first DC bus storage unit 104 is equal to a first DC voltage Vdc1. Since the first converting circuit 10 comprises the first generator-side converter 102, the first network-side converter 103 and the first DC bus storage unit 104, the first converting circuit 10 has an AC/DC/AC circuitry configuration.

In the embodiment of FIG. 1, the first converting circuit 10 has a two-level circuitry configuration. Moreover, the first generator-side converter 102 comprises two bridge arms. That is, the first generator-side converter 102 has a single-phase full-bridge two-level circuitry configuration. Moreover, the two bridge arms are collaboratively defined as an H bridge. And each bridge contains two serially-connected switch elements. An example of the switch element includes but is not limited to an insulated gate bipolar transistor (IGBT). The first network-side converter 103 has a three-phase full-bridge two-level circuitry configuration. Moreover, the first network-side converter 103 comprises three bridge arms, including an A-phase bridge arm, a B-phase bridge arm and a C-phase bridge arm. And each phase bridge arm contains two serially-connected switch elements. Moreover, the first generator-side converter 102 further comprises a chopper circuit 105. The chopper circuit 105 is connected with the two bridge arms of the first generator-side converter 102 in parallel. In this embodiment, the chopper circuit 105 comprises at least one switch element and at least one resistor, which are connected with each other in series. The chopper circuit 105 is used for inhibiting the voltage and current of the first converting circuit 10 in order to achieve a protecting purpose.

Moreover, the second converting circuit 11 is a three/three phase converting circuit. In this embodiment, the second converting circuit 11 comprises a second generator-side converter 112, a second network-side converter 113 and a second DC bus storage unit 114. The second generator-side converter 112 has a third AC side and a third DC side. The third AC side is electrically connected with the plural second generator-side terminals 110 of the second converting circuit 11, serially connected with the corresponding first generator-side terminals 100 of the plural first converting circuits 10 through the plural second generator-side terminals 110, and electrically connected with the power transmission terminals 80 of the wind power generator 8. The second generator-side converter 112 is controlled by a pulse width modulation (PWM) method. The second network-side converter 113 has a fourth AC side and a fourth DC side. The fourth AC side is electrically connected with the corresponding secondary winding Np of the plural secondary windings Np of the isolating transformer T. The fourth AC side is served as the second network-side terminal 111. Moreover, the second network-side converter 113 is also controlled by the PWM method. In this embodiment, the second DC bus storage unit 114 comprises at least one bus capacitor. The second DC bus storage unit 114 is electrically connected between the third DC side of the second generator-side converter 112 and the fourth DC side of the second network-side converter 113. Moreover, the second DC bus storage unit 114 is used for storing electric energy, so that the voltage difference across the second DC bus storage unit 114 is equal to a second DC voltage Vdc2. Since the second converting circuit 11 comprises the second generator-side converter 112, the second network-side converter 113 and the second DC bus storage unit 114, the second converting circuit 11 has an AC/DC/AC circuitry configuration.

In the embodiment of FIG. 1, the second converting circuit 11 has a two-level circuitry configuration. Moreover, the second generator-side converter 112 comprises three bridge arms, wherein each bride arm comprises two serially-connected switch elements. That is, the second generator-side converter 112 has a three-phase full-bridge two-level circuitry configuration. Moreover, the second network-side converter 113 comprises three bridge arms, wherein each bride arm comprises two serially-connected switch elements. That is, the second network-side converter 113 also has a three-phase full-bridge two-level circuitry configuration. Moreover, the node between the two serially-connected switch elements of each bridge arm of the second generator-side converter 112 is connected with the corresponding second generator-side terminal 110. Moreover, the second generator-side converter 112 further comprises a chopper circuit. The function of the chopper circuit of the second generator-side converter 112 is similar to that of the chopper circuit 105 of the first generator-side converter 102, and is not redundantly described herein.

It is noted that numerous modifications and alterations of the first converting circuit and the second converting circuit may be made while retaining the teachings of the invention. Hereinafter, some variant examples of the first converting circuit and the second converting circuit will be illustrated with reference to FIGS. 2-5. Component parts and elements corresponding to those of the first embodiment are designated by identical numeral references, and detailed descriptions thereof are omitted.

Figure 2:
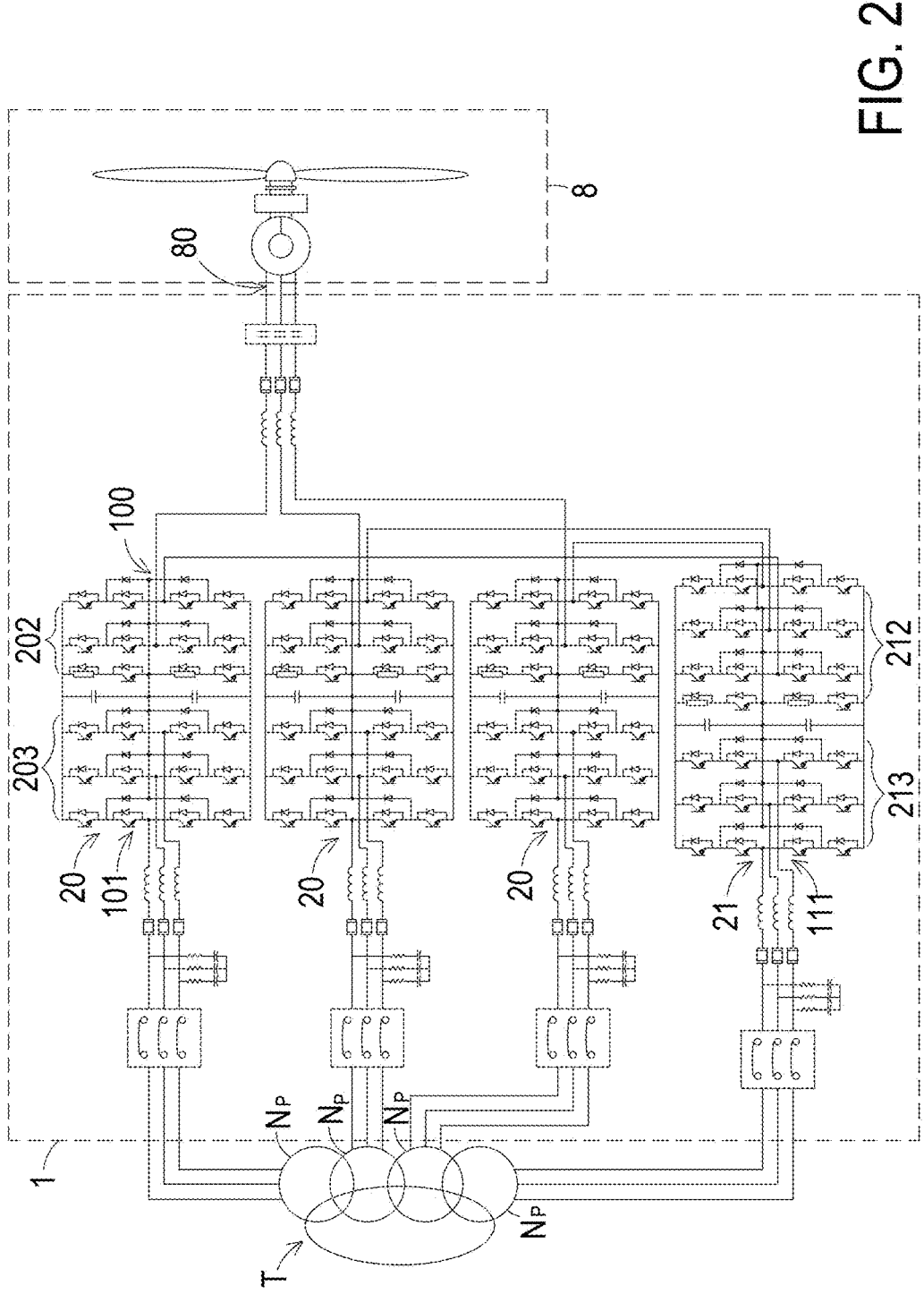
FIG. 2 is a schematic circuit diagram of a wind power conversion system according to a second embodiment of the present invention.

FIG. 2 is a schematic circuit diagram of a wind power conversion system according to a second embodiment of the present invention. In comparison with FIG. 1, the first converting circuit 20 of the wind power conversion system 1 of this embodiment has a three-level circuitry configuration. The first generator-side converter 202 of the first converting circuit 20 has a single-phase full-bridge three-level circuitry configuration, and the first network-side converter 203 of the first converting circuit 20 has a three-phase three-level circuitry configuration. In comparison with FIG. 1, the second converting circuit 21 of the wind power conversion system 1 of this embodiment has a three-level circuitry configuration. The second generator-side converter 212 of the second converting circuit 21 has a three-phase full-bridge three-level circuitry configuration, and the second network-side converter 213 of the second converting circuit 21 has a three-phase three-level circuitry configuration.

Figure 3:
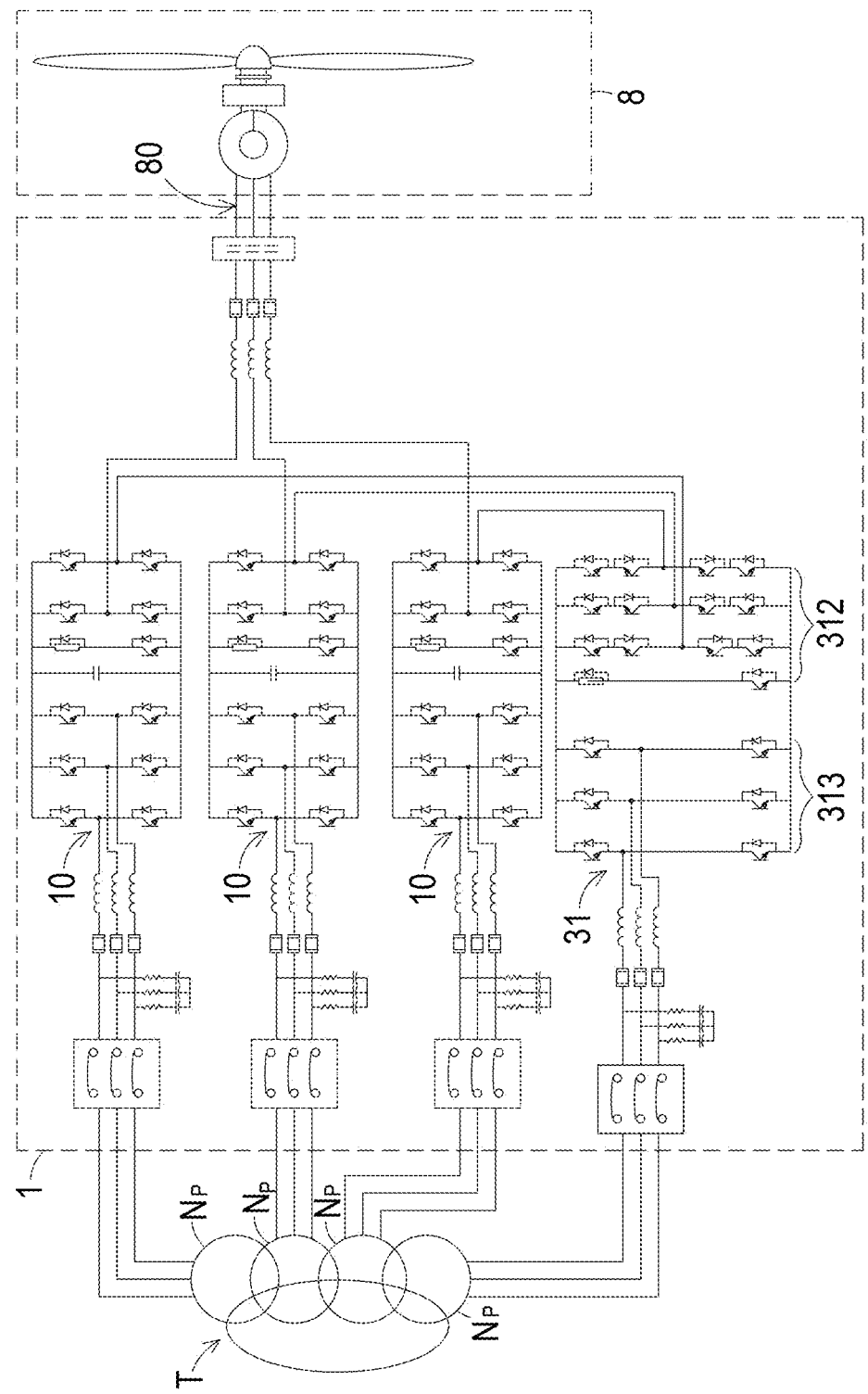
FIG. 3 is a schematic circuit diagram of a wind power conversion system according to a third embodiment of the present invention.

FIG. 3 is a schematic circuit diagram of a wind power conversion system according to a third embodiment of the present invention. In the embodiment of FIG. 1, the second converting circuit 11 has the AC/DC/AC circuitry configuration. In this embodiment, the second converting circuit 31 is a two stage matrix converting circuit. Consequently, the second converting circuit 31 has an AC/AC circuitry configuration. In this embodiment, the second converting circuit 31 comprises a second generator-side converter 312 and a second network-side converter 313, but the second DC bus storage unit 114 of FIG. 1 is omitted.

Figure 4:
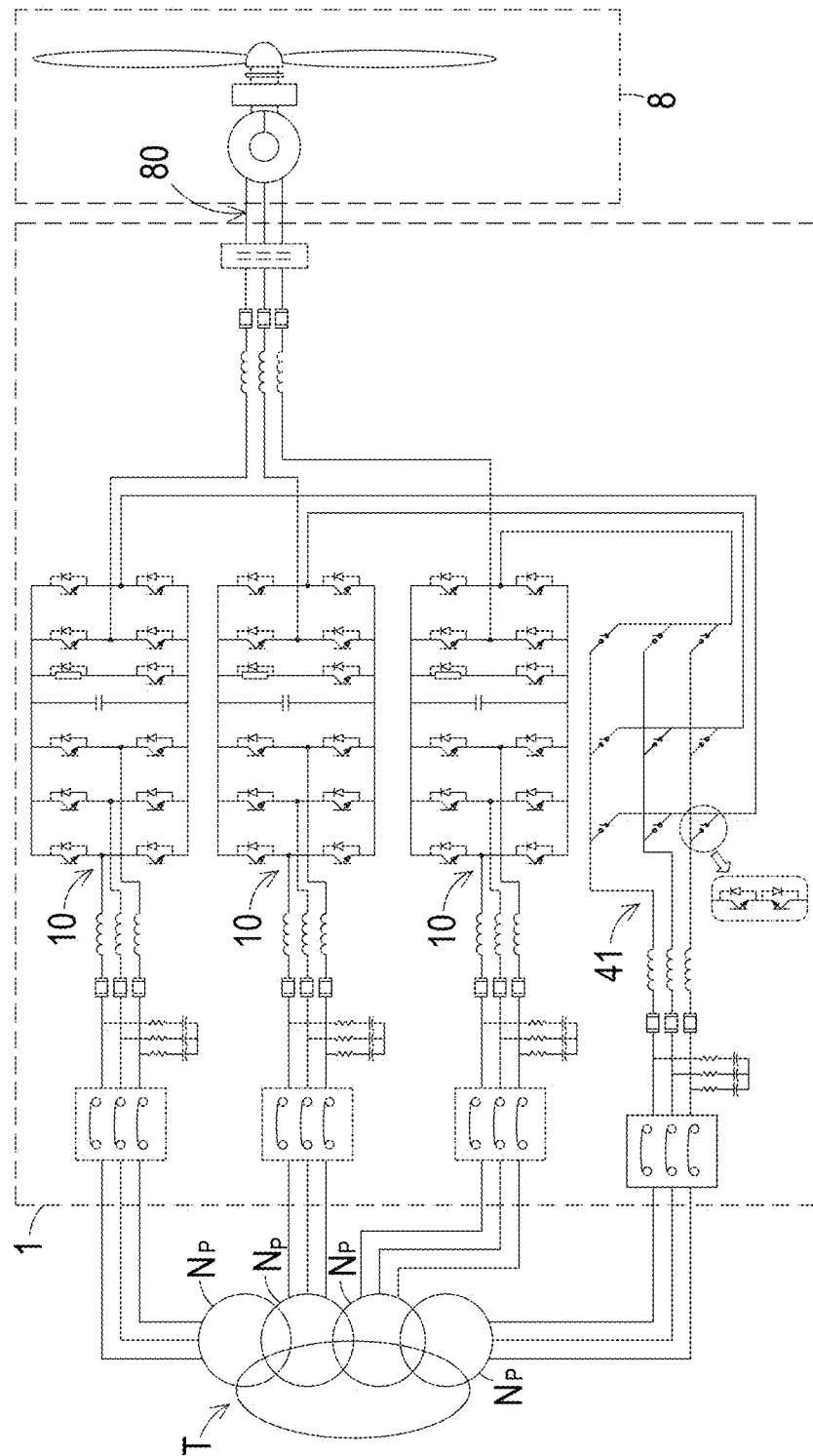
FIG. 4 is a schematic circuit diagram of a wind power conversion system according to a fourth embodiment of the present invention.

FIG. 4 is a schematic circuit diagram of a wind power conversion system according to a fourth embodiment of the present invention. Like the second converting circuit 31 of FIG. 3, the second converting circuit 41 of this embodiment also has an AC/AC circuitry configuration. However, the second converting circuit 41 is a conventional matrix converting circuit.

Figure 5:
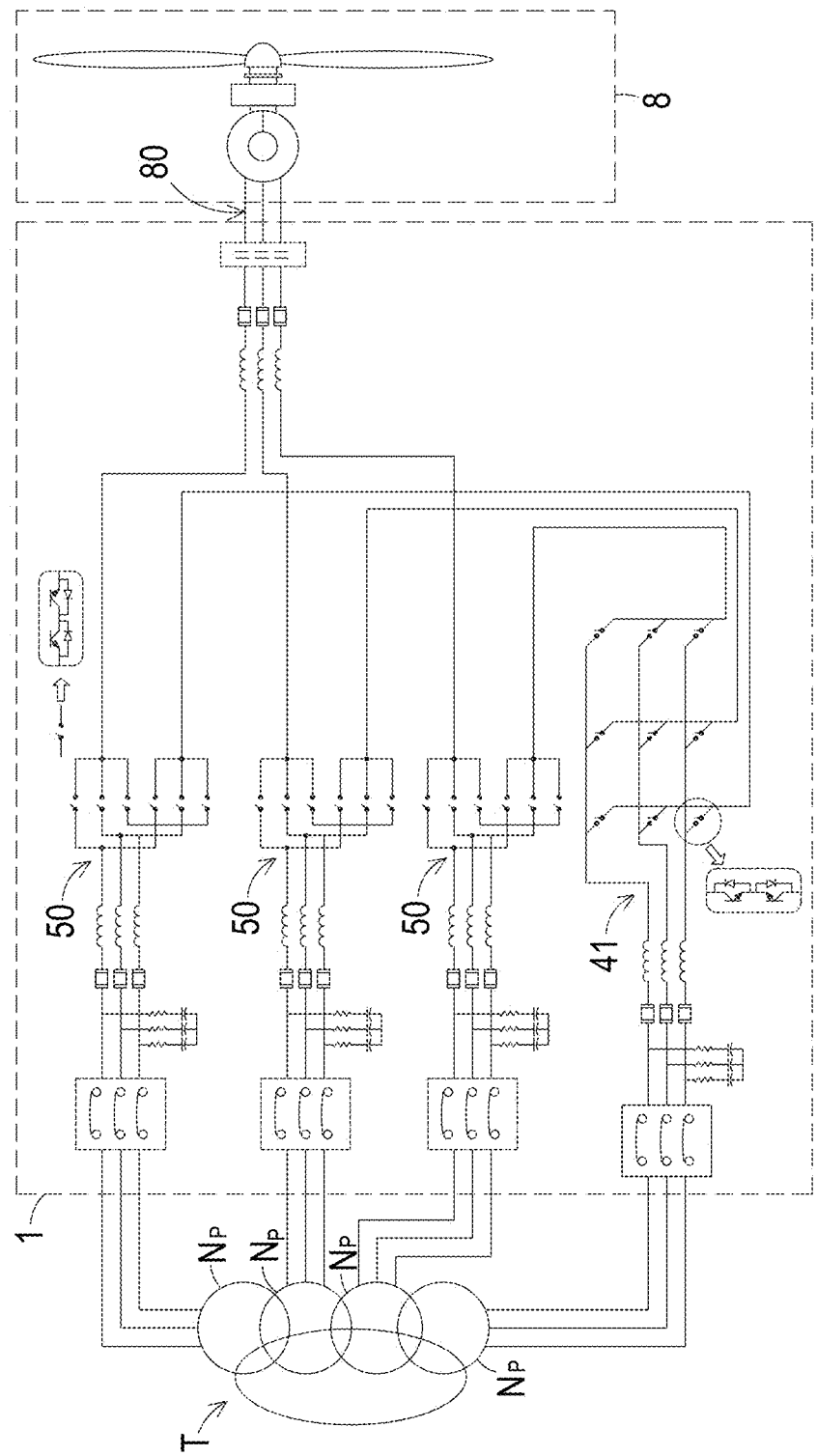
FIG. 5 is a schematic circuit diagram of a wind power conversion system according to a fifth embodiment of the present invention.

FIG. 5 is a schematic circuit diagram of a wind power conversion system according to a fifth embodiment of the present invention. In the embodiment of FIG. 4, the first converting circuit 10 has the AC/DC/AC circuitry configuration. In comparison with FIG. 4, the first converting circuit 50 of this embodiment is a three/single phase matrix converting circuit. That is, the first converting circuit 50 has an AC/AC circuitry configuration.

Figure 6:
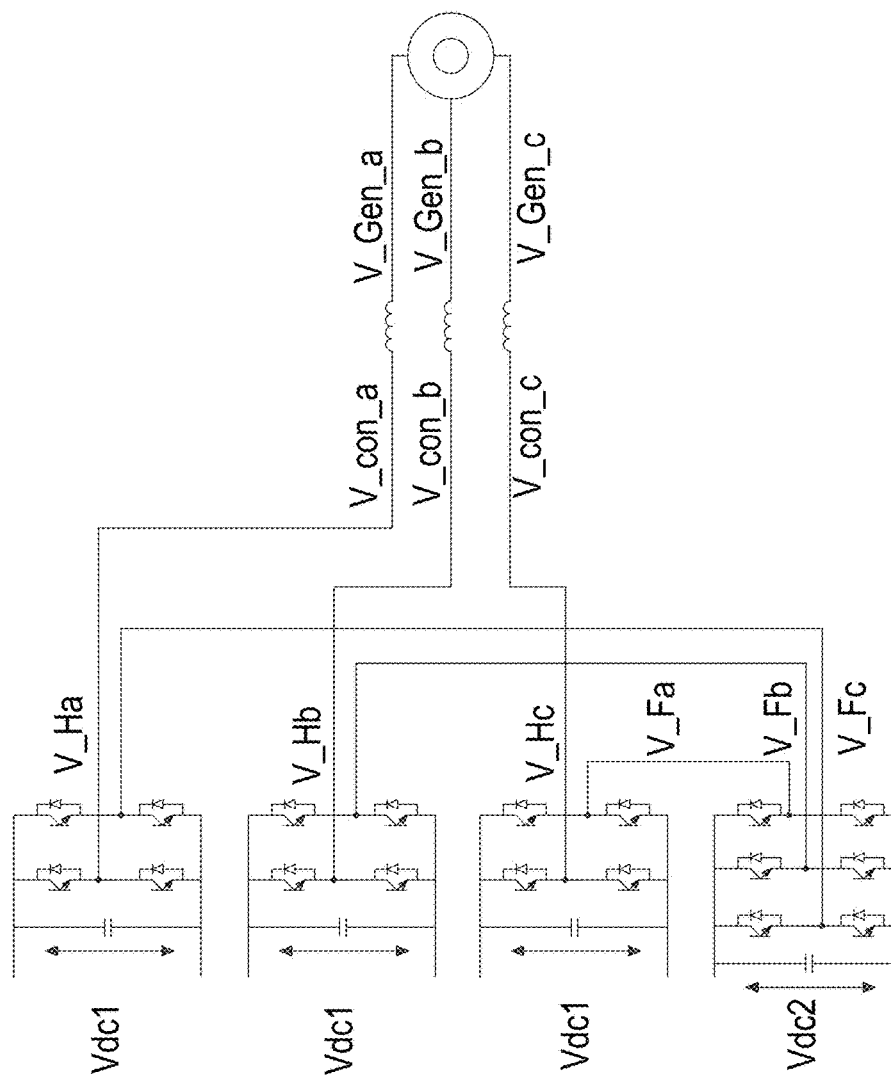
FIG. 6 is a schematic circuit diagram illustrating a portion of the wind power conversion system of FIG. 1.
Figure 7:
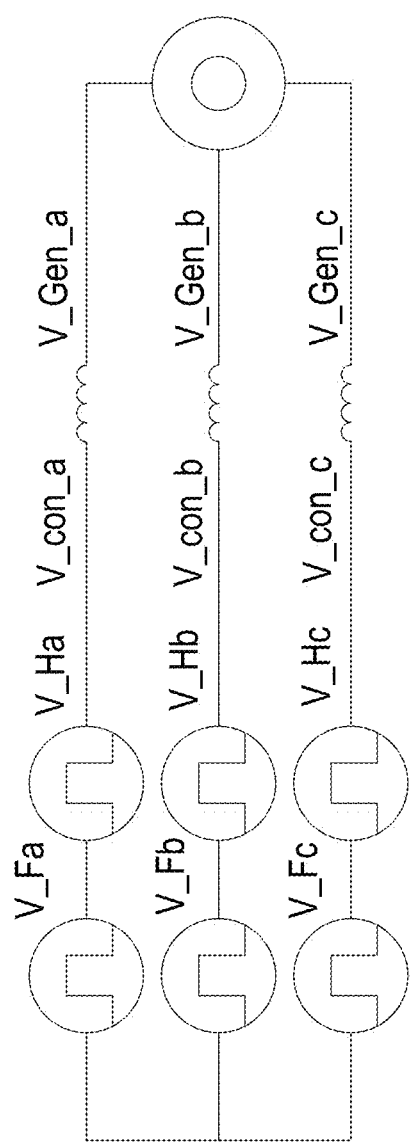
FIG. 7 is a schematic circuit diagram illustrating the simplified model of FIG. 6.

Hereinafter, the performance of the wind power conversion system 1 of the present invention will be illustrated with reference to FIGS. 1, 6 and 7. FIG. 6 is a schematic circuit diagram illustrating a portion of the wind power conversion system of FIG. 1. FIG. 7 is a schematic circuit diagram illustrating the simplified model of FIG. 6. As shown in FIGS. 6 and 7, the voltages V_Fa, V_Fb and V_Fc are phase voltages at the A-phase second generator-side terminal 110, the B-phase second generator-side terminal 110 and the C-phase second generator-side terminal 110 of the second converting circuit 11, respectively. The voltage V_Ha is the output voltage from the first AC side of the first generator-side converter 102 of the first converting circuit 10 which is connected with the A-phase winding of the three phase windings of the wind power generator 8. The voltage V_Hb is the output voltage from the first AC side of the first generator-side converter 102 of the first converting circuit 10 which is connected with the B-phase winding of the three phase windings of the wind power generator 8. The voltage V_Hc is the output voltage from the first AC side of the first generator-side converter 102 of the first converting circuit 10 which is connected with the C-phase winding of the three phase windings of the wind power generator 8. The voltages V_Gen_a, V_Gen_b and V_Gen_c are the phase voltages of the A-phase winding, the B-phase winding and the C-phase winding of the three phase windings of the wind power generator 8, respectively. The voltage V_conv_a is the output voltage from the first generator-side terminal 100 of the first converting circuit 10 which is connected with the A-phase winding of the three phase windings of the wind power generator 8. The voltage V_conv_b is the output voltage from the first generator-side terminal 100 of the first converting circuit 10 which is connected with the B-phase winding of the three phase windings of the wind power generator 8. The voltage V_conv_c is the output voltage from the first generator-side terminal 100 of the first converting circuit 10 which is connected with the C-phase winding of the three phase windings of the wind power generator 8.

The output voltages V_Ha, V_Hb and V_Hc from the three first converting circuits 10 may be expressed by the following formulae:

$$V\_Ha = Vdc1 \times S\_Ha;$$

$$V\_Hb = Vdc1 \times S\_Hb; \text{ and}$$

$$V\_Hc = Vdc1 \times S\_Hc.$$

In the above formulae, S_Ha, S_Hb and S_Hc are the duty ratios of the switch elements of the bridge arms in the first generator-side converters 102 which are connected with the A-phase winding, the B-phase winding and the C-phase winding of the three phase windings of the wind power generator 8, respectively, and Vdc1 is the first DC voltage of the first DC bus storage unit 104. In case that the first converting circuit is a matrix converting circuit (e.g. the matrix converting circuit of FIG. 5), the first DC voltage Vdc1 is a virtual DC voltage.

The phase voltages V_Fa, V_Fb and V_Fc from the second converting circuit 11 may be expressed by the following formulae:

$$V\_Fa = Vdc2/2 \times S\_Fa;$$

$$V\_Fb = Vdc2/2 \times S\_Fb; \text{ and}$$

$$V\_Fc = Vdc2/2 \times S\_Fc.$$

In the above formulae, S_Fa, S_Fb and S_Fc are the duty ratios of the switch elements in the three bridge arms of the second generator-side converter 112 of the second converting circuit 21, respectively, and Vdc2 is the second DC voltage of the second DC bus storage unit 114. In case that the second converting circuit is a matrix converting circuit (e.g. the matrix converting circuit of FIG. 3 or FIG. 4), the second DC voltage Vdc2 is a virtual DC voltage.

Since each second generator-side terminal 110 of the second converting circuit 11 is electrically connected with the corresponding first generator-side terminal 100 of the first converting circuit 10 in series, the output voltage from the first generator-side terminal 100 of the first converting circuit 10 and the output voltage from the corresponding second generator-side terminal 110 of the second converting circuit 11 are connected with each other in series. Consequently, the sum of the phase voltage V_Fa and the output voltage V_Ha is equal to the A-phase output voltage V_conv_a of the first converting circuit 10, the sum of the phase voltage V_Fb and the output voltage V_Hb is equal to the B-phase output voltage V_conv_b of the first converting circuit 10, and the sum of the phase voltage V_Fc and the output voltage V_Hc is equal to the C-phase output voltage V_conv_c of the first converting circuit 10. If Vdc1=Vdc2 and S_Hx=S_Fx (x=a, b, c), the output voltages V_conv_a, V_conv_b and V_conv_c may be expressed by the following formulae:

$$V\_conv\_a = V\_Ha + V\_Fa = Vdc1 \times S\_Ha + Vdc2/2 \times S\_Fa = 3/2 \times Vdc1 \times S\_Ha;$$

$$V\_conv\_b = V\_Hb + V\_Fb = Vdc1 \times S\_Hb + Vdc2/2 \times S\_Fb = 3/2 \times Vdc1 \times S\_Hb;$$

$$V\_conv\_c = V\_Hc + V\_Fc = Vdc1 \times S\_Hc + Vdc2/2 \times S\_Fc = 3/2 \times Vdc1 \times S\_Hc.$$

From the above formulae, if Vdc1=2000V and the duty ratio is the largest, the maximum linear voltage outputted from each first converting circuit 10 is equal to $3/2 \times Vdc1 \times \sqrt{3}/\sqrt{2} = 3674$.

Consequently, the wind power conversion system of the present invention may be applied to the wind power generator 8 at 3.3 kV.

From the above descriptions, the wind power conversion system 1 comprises the plural first converting circuits 10 and the second converting circuit 11. The plural second generator-side terminals 110 of the second converting circuit 11 are electrically connected with the corresponding first generator-side terminals 100 of the plural first converting circuits 10 in series. The second network-side terminal 111 of the second converting circuit 11 is electrically connected with the corresponding secondary winding Np of the plural secondary windings Np of the isolating transformer T. By means of the circuitry configuration of the wind power conversion system, the number of the secondary windings Np of the isolating transformer T is reduced. For example, as shown in FIG. 1, the isolating transformer T comprises only four secondary windings Np. Consequently, the overall cost of the wind power conversion system 1 is reduced. Moreover, since the power converting task of the plural first converting circuits 10 is shared by the second converting circuit 11, the voltage stress applied to the plural first converting circuits 10 will be reduced. Consequently, the power components (e.g. switch elements) with lower voltage-withstanding capacity (e.g. 1.7 KV) may be used in the wind power conversion system 1 in order to control the wind power generator 8 at the medium voltage levels. Moreover, since the number of the power components used in the wind power conversion system 1 is reduced and the power components have the lower voltage-withstanding capacity, the fabricating cost of the wind power conversion system 1 is largely reduced.

In some embodiments, the second converting circuit as shown in FIGS. 1-5 is selectively operated in a crowbar mode or a non-crowbar mode according to the result of comparing the phase voltage of each phase winding of the wind power generator 8 with the maximum output voltage of the corresponding first generator-side terminal 100 of the first converting circuit 10. Take the wind power conversion system 1 of FIG. 1 as an example. If the phase voltage of each phase winding of the wind power generator 8 is lower than or equal to the maximum output voltage of the corresponding first generator-side terminal 100 of the first converting circuit 10, the second converting circuit 11 is operated in the crowbar mode. In the crowbar mode, the switching actions of all switch elements of the second converting circuit 11 are disabled. Under this circumstance, the second generator-side terminals 110 of the second converting circuit 11 are short-circuited. That is, when the second converting circuit 11 is operated in the crowbar mode, only the plural first converting circuits 10 of the wind power conversion system 1 are enabled to perform the power conversion between the wind power generator 8 and the AC power network. Since the second converting circuit 11 is disabled, the power consumption of the wind power conversion system 1 is reduced. On the other hand, if the phase voltage of one phase winding of the wind power generator 8 is higher than the maximum output voltage of the corresponding first generator-side terminal 100 of the first converting circuit 10, the second converting circuit 11 is operated in the non-crowbar mode. In the non-crowbar mode, the switching actions of all switch elements of the second converting circuit 11 are enabled. Consequently, the power converting task of the plural first converting circuits 10 is shared by the second converting circuit 11. In an embodiment, the phase voltage at each second generator-side terminal 110 is one half of the output voltage from the first generator-side terminal 100 of the corresponding first converting circuit 10.

Moreover, the wind power conversion system 1 further comprises a controlling circuit (not shown). Under control of the controlling circuit, the second converting circuit 11 is operated in the crowbar mode or the non-crowbar mode. For reducing the transient voltage response (dv/dt) and the harmonic voltages at the first generator-side terminals 100 of the first converting circuit 10 and the second generator-side terminals 110 of the second converting circuit 11, the first generator-side converters 102 of the plural first converting circuits 10 and the second generator-side converter 112 of the second converting circuit 11 of the wind power conversion system as shown in FIG. 1, 2, 3 or 4 may be controlled by a sinusoidal pulse width modulation (SPWM) method based on a carrier phase-shifting technique. Moreover, the phase shift angle for the carrier phase-shifting technique may be determined according to the circuitry configuration and the operating mode of the second converting circuit.

Figure 8:
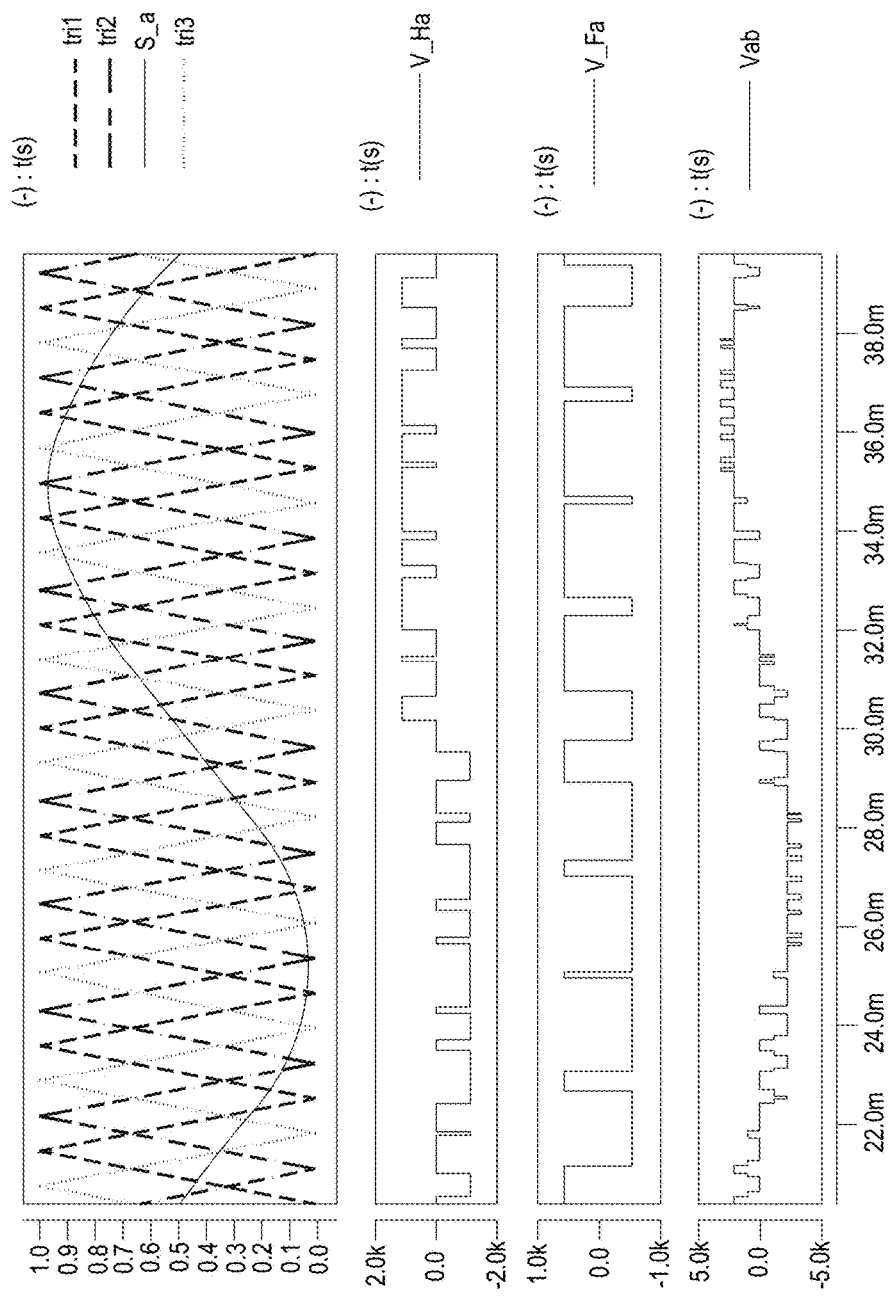
FIG. 8 is a schematic waveform diagram illustrating the associated signals of the A-phase circuit of the wind power conversion system of FIG. 1 in a first carrier phase-shifting mode and with the SPWM control.
Figure 9:
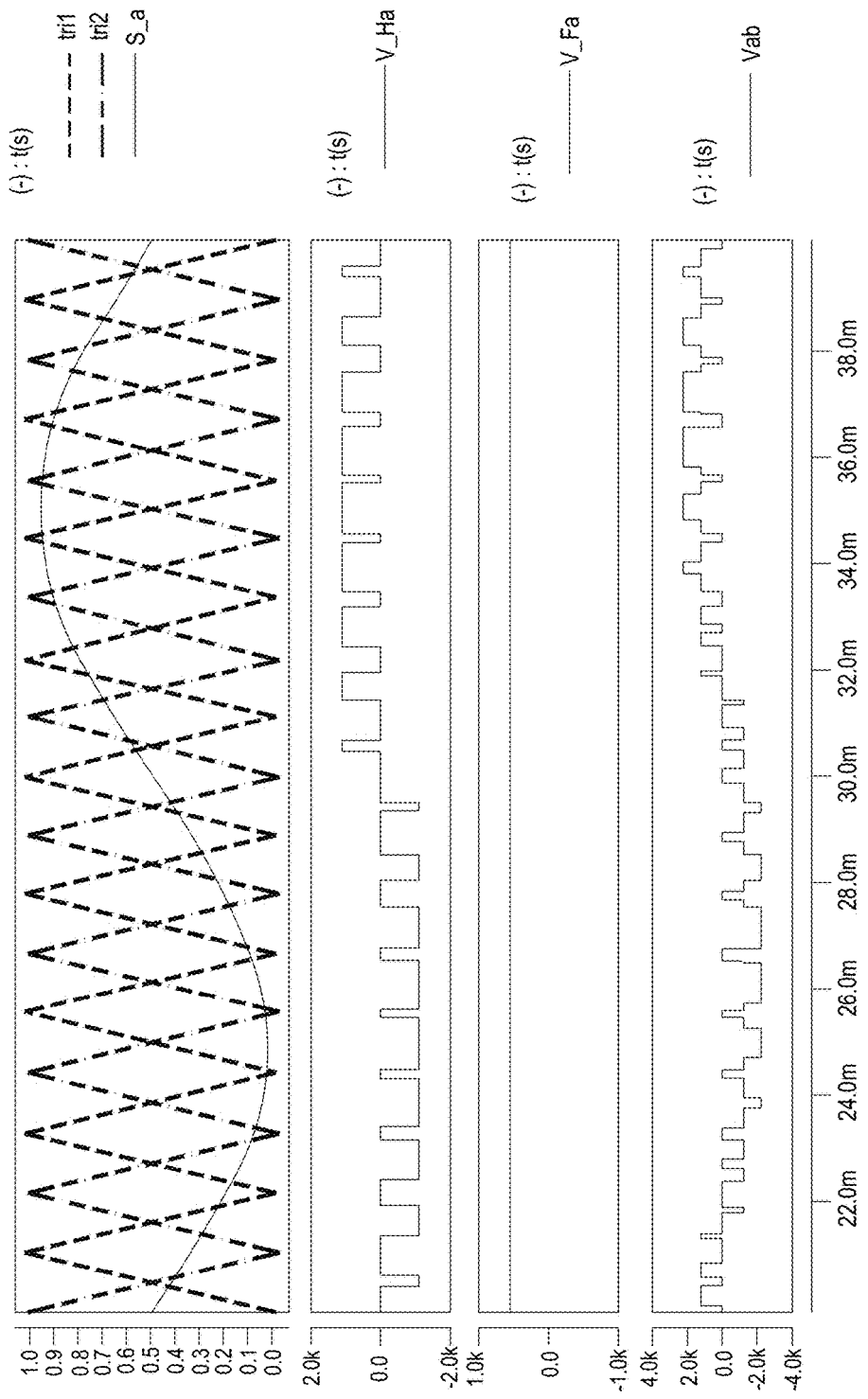
FIG. 9 is a schematic waveform diagram illustrating the associated signals of the A-phase circuit of the wind power conversion system of FIG. 1 in a second carrier phase-shifting mode and with the SPWM control.
Figure 10:
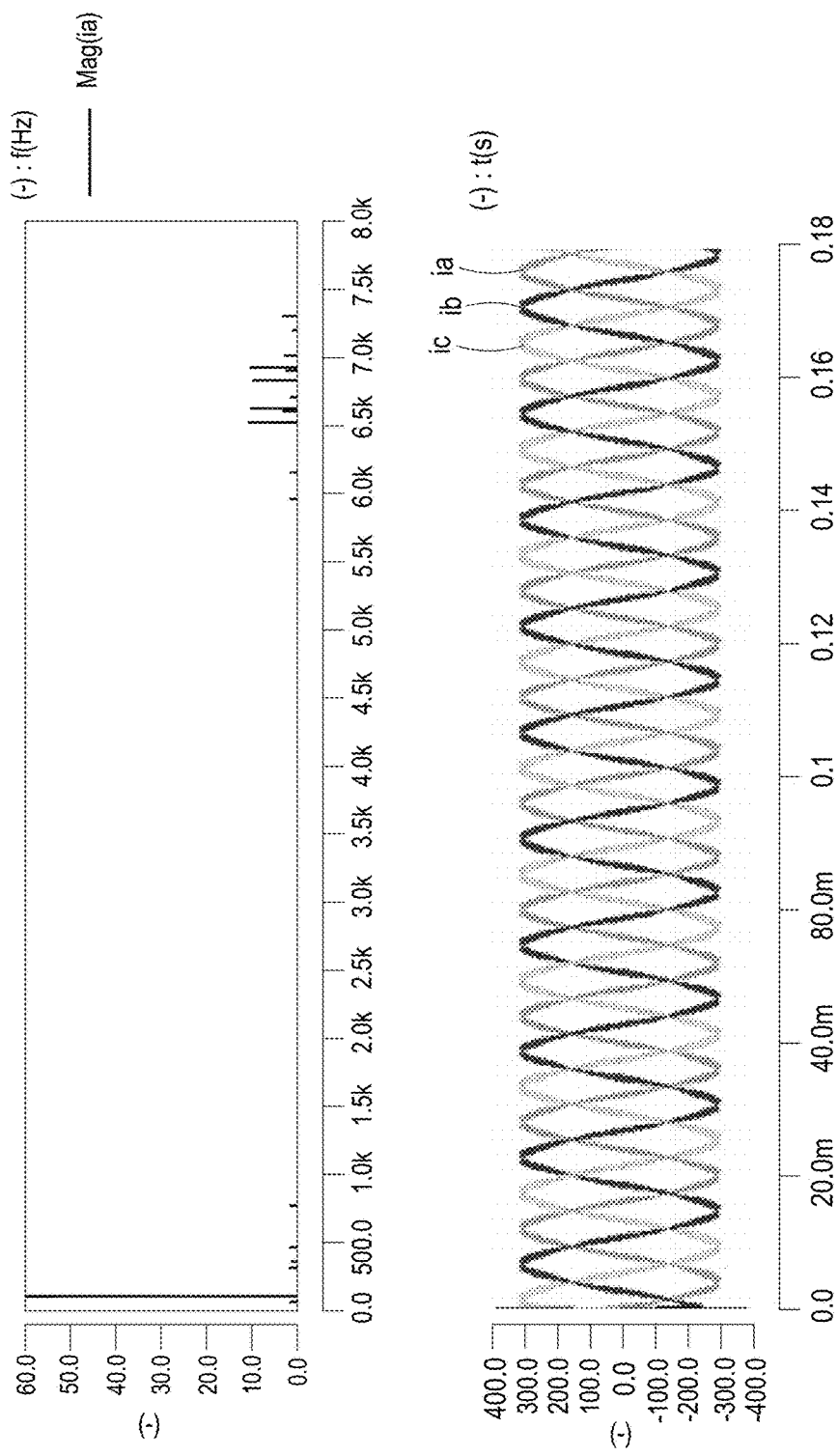
FIG. 10 is a schematic waveform diagram illustrating the three phase currents and the current spectrum of the two-level first converting circuit or the two-level second converting circuit in the first carrier phase-shifting mode and with the SPWM control.
Figure 11:
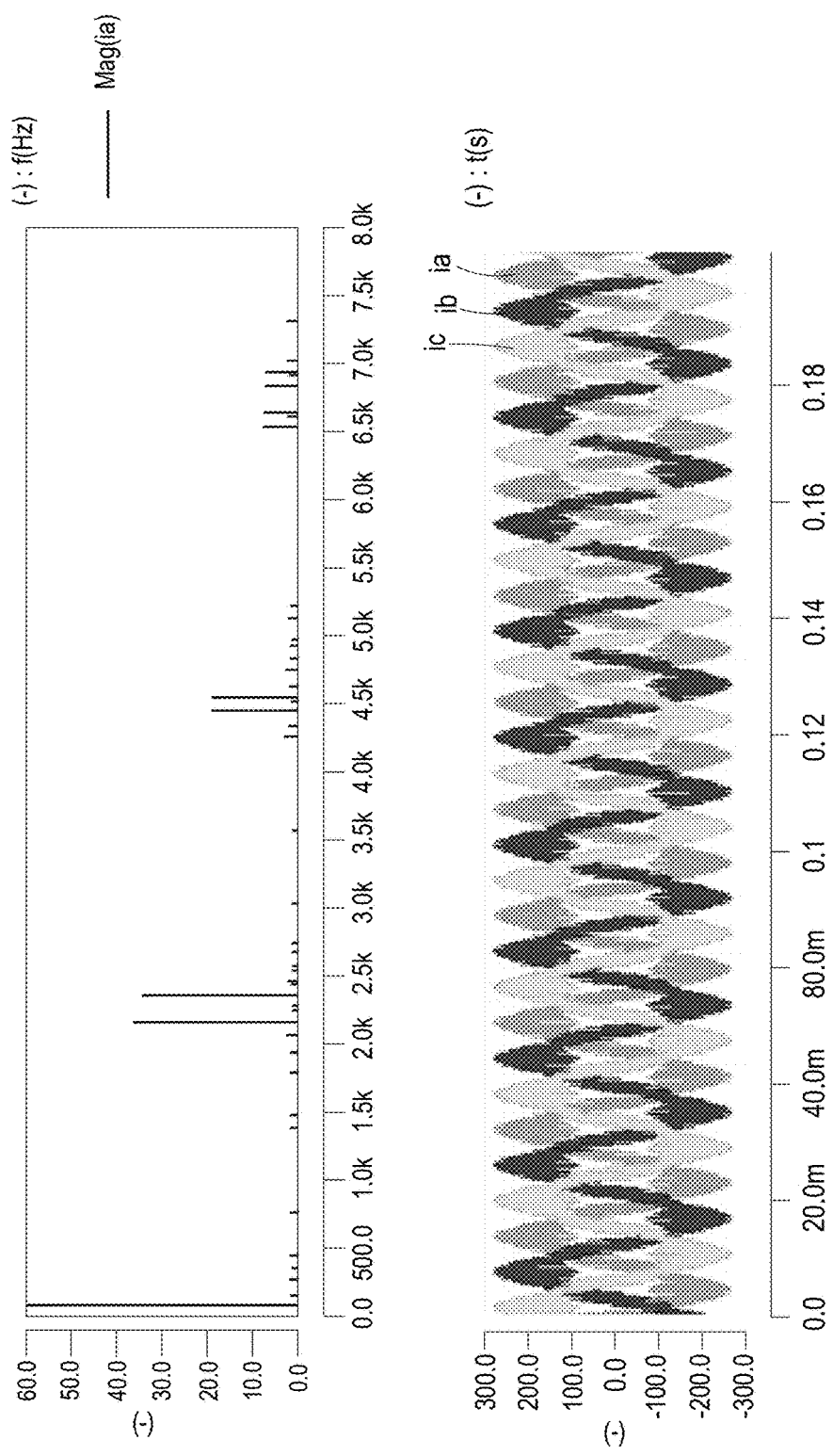
FIG. 11 is a schematic waveform diagram illustrating the three phase currents and the current spectrum of the two-level first converting circuit or the two-level second converting circuit in the first carrier phase-shifting mode and without the SPWM control.
Figure 12:
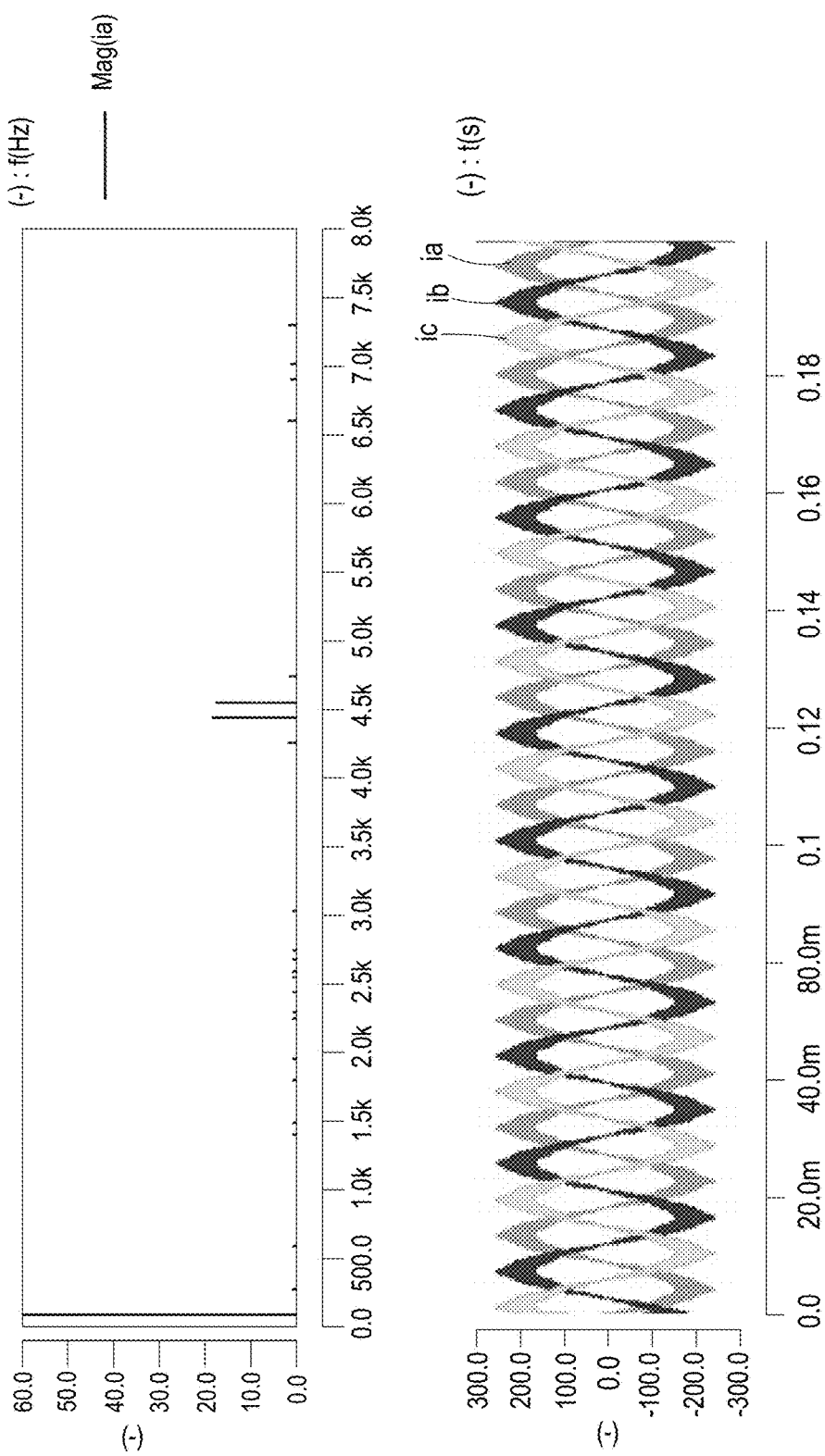
FIG. 12 is a schematic waveform diagram illustrating the three phase currents and the current spectrum of the two-level first converting circuit or the two-level second converting circuit in the second carrier phase-shifting mode and with the SPWM control.
Figure 13:
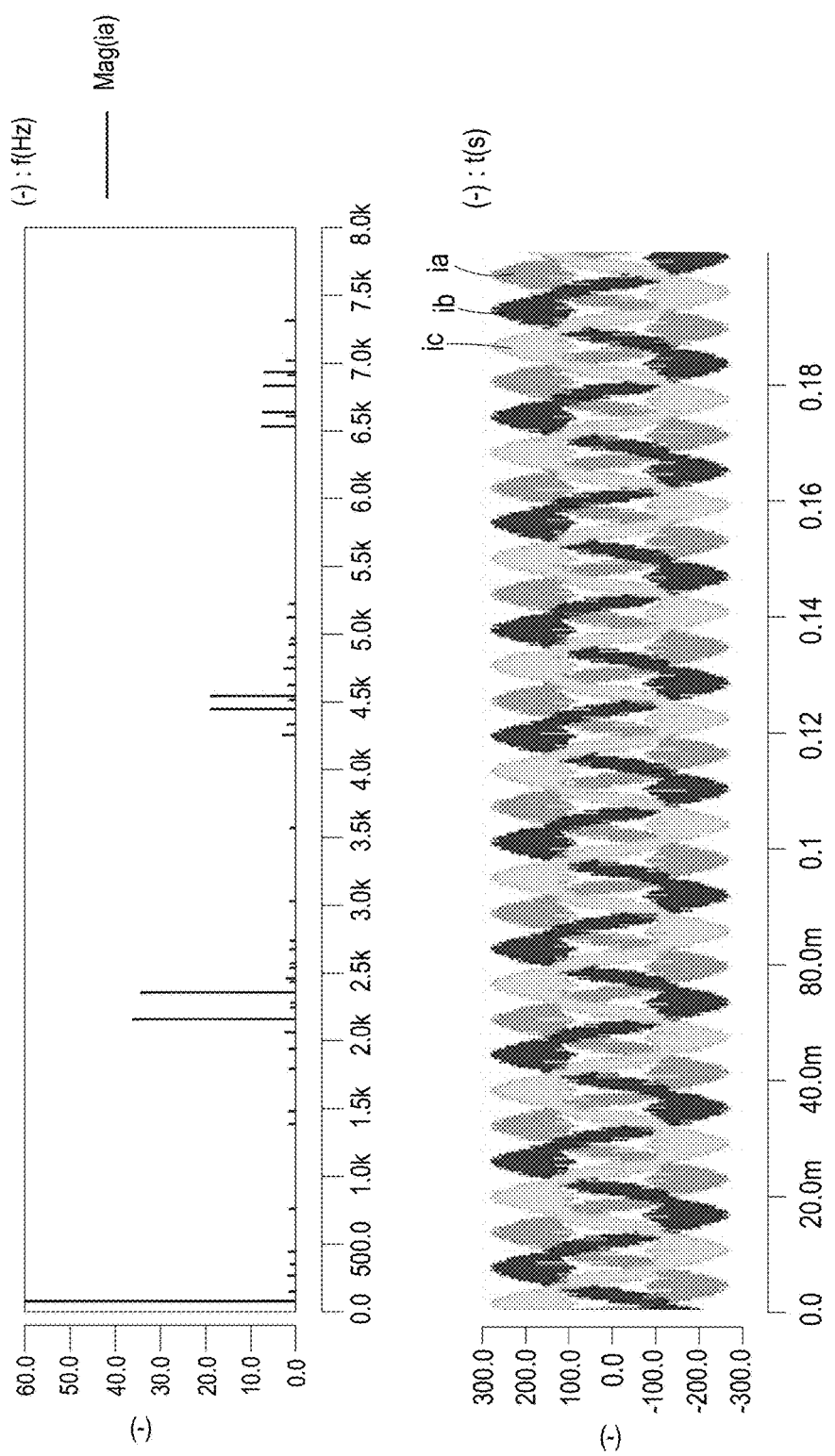
FIG. 13 is a schematic waveform diagram illustrating the three phase currents and the current spectrum of the two-level first converting circuit or the two-level second converting circuit in the second carrier phase-shifting mode and without the SPWM control.

The benefits of the SPWM control will be illustrated with reference to FIGS. 8-13. FIG. 8 is a schematic waveform diagram illustrating the associated signals of the A-phase circuit of the wind power conversion system of FIG. 1 in a first carrier phase-shifting mode and with the SPWM control. FIG. 9 is a schematic waveform diagram illustrating the associated signals of the A-phase circuit of the wind power conversion system of FIG. 1 in a second carrier phase-shifting mode and with the SPWM control. FIG. 10 is a schematic waveform diagram illustrating the three phase currents (ia, ib, ic) and the current spectrum of the two-level first converting circuit or the two-level second converting circuit in the first carrier phase-shifting mode and with the SPWM control. FIG. 11 is a schematic waveform diagram illustrating the three phase currents and the current spectrum of the two-level first converting circuit or the two-level second converting circuit in the first carrier phase-shifting mode and without the SPWM control. FIG. 12 is a schematic waveform diagram illustrating the three phase currents and the current spectrum of the two-level first converting circuit or the two-level second converting circuit in the second carrier phase-shifting mode and with the SPWM control. FIG. 13 is a schematic waveform diagram illustrating the three phase currents and the current spectrum of the two-level first converting circuit or the two-level second converting circuit in the second carrier phase-shifting mode and without the SPWM control.

In the first carrier phase-shifting mode, the first converting circuits and the second converting circuit have the AC/DC/AC circuitry configurations. If the second converting circuit is operated in the non-crowbar mode, the phase shift angles among the carrier waves of the two bridge arms of the first generator-side converter of the first converting circuit (e.g. the H bridge) and the corresponding bridge arm of the second converting circuit (e.g. the three-phase full bridge) are 120°. In FIG. 8, tri1 denotes the carrier wave of the left bridge arm of the first generator-side converter of the first converting circuit, tri2 denotes the carrier wave of the right bridge arm of the first generator-side converter of the first converting circuit, and tri3 denotes the carrier wave of the corresponding bridge arm of the second generator-side converter of the second converting circuit. According to the A-phase circuit modulation result of FIG. 8, the phase shift angles among tri1, tri2 and tri3 are 120°, and the modulated waves S_a of them are identical. By this modulation method, the linear voltage Vab outputted by the first converting circuit has seven levels. In comparison with the modulation result of FIG. 11 (i.e. in the first carrier phase-shifting mode and without the SPWM control), the modulation result of FIG. 10 (i.e. in the first carrier phase-shifting mode and with the SPWM control) indicates that the transient voltage response and the harmonic voltages at the first generator-side terminals 100 of the first converting circuit 10 and the second generator-side terminals 110 of the second converting circuit 11 are reduced. On the other hand, if the first converting circuit and the second converting circuit have the AC/DC/AC circuitry configurations (i.e. in the first carrier phase-shifting mode) and the second converting circuit is operated in the crowbar mode, only the first generator-side converters 102 of the plural first converting circuits 10 are controlled by the SPWM method based on the carrier phase-shifting technique because the second converting circuit 11 is disabled. Under this circumstance, the phase shift angle between the carrier waves of the two bridge arms of the first generator-side converter of the first converting circuit is 180°. Similarly, the transient voltage response and the harmonic voltages at the first generator-side terminals 100 of the first converting circuit 10 and the second generator-side terminals 110 of the second converting circuit 11 are reduced.

In the first carrier phase-shifting mode, the first converting circuits have the AC/DC/AC circuitry configurations, and the second converting circuit has the AC/AC circuitry configuration. The first generator-side converters 102 of the plural first converting circuits 10 are controlled by the SPWM method based on the carrier phase-shifting technique. Regardless of whether the second converting circuit is operated in the crowbar mode or the non-crowbar mode, the phase shift angle between the carrier waves of the two bridge arms of the first generator-side converter of the first converting circuit is 180°. In FIG. 9, tri1 denotes the carrier wave of the left bridge arm of the first generator-side converter of the first converting circuit, and tri2 denotes the carrier wave of the right bridge arm of the first generator-side converter of the first converting circuit. In addition, the modulated wave S_a is identical. By this modulation method, the linear voltage Vab outputted by the first converting circuit (see FIG. 1) has five levels. In comparison with the modulation result of FIG. 13 (i.e. in the second carrier phase-shifting mode and without the SPWM control), the modulation result of FIG. 12 (i.e. in the second carrier phase-shifting mode and with the SPWM control) indicates that the transient voltage response and the harmonic voltages at the first generator-side terminals 100 of the first converting circuit 10 and the second generator-side terminals 110 of the second converting circuit 11 are reduced. Moreover, the amplitude modulation ratio in the crowbar mode is 1.5 times the amplitude modulation ratio in the non-crowbar mode. Consequently, the harmonic component is further reduced.

From the above descriptions, the present invention provides a wind power conversion system. The wind power conversion system comprises plural first converting circuits and a second converting circuit. The plural second generator-side terminals of the second converting circuit are electrically connected with the corresponding first generator-side terminals of the plural first converting circuits in series. The second network-side terminal of the second converting circuit is electrically connected with the corresponding secondary winding of the plural secondary windings of an isolating transformer. By means of the circuitry configuration of the wind power conversion system, the number of the secondary windings of the isolating transformer is reduced. Moreover, since the power converting task of the plural first converting circuits is shared by the second converting circuit, the voltage stress applied to the plural first converting circuits will be reduced. Consequently, the power components with lower voltage-withstanding capacity may be used in the wind power conversion system in order to control the wind power generator at the medium voltage levels. Moreover, since the number of the power components used in the wind power conversion system is reduced and the power components have the lower voltage-withstanding capacity, the fabricating cost of the wind power conversion system is largely reduced. Moreover, the second converting circuit is selectively operated in a crowbar mode or a non-crowbar mode according to the result of comparing the phase voltage of each phase winding of the wind power generator with the output voltage of the corresponding first generator-side terminal of the first converting circuit. When the second converting circuit is operated in the crowbar mode, the second converting circuit is disabled, so that the power consumption of the wind power conversion system is reduced. When the second converting circuit is operated in the non-crowbar mode, the power converting task of the plural first converting circuits is shared by the second converting circuit. Moreover, the first generator-side converters of the plural first converting circuits and the second generator-side converter of the second converting circuit may be controlled by a sinusoidal pulse width modulation (SPWM) method based on a carrier phase-shifting technique. Consequently, the transient voltage response and the harmonic voltages at the first generator-side terminals of the first converting circuit and the second generator-side terminals of the second converting circuit will be minimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wind power conversion system electrically connected between a wind power generator and an isolating transformer, the wind power conversion system comprising:
plural first converting circuits performing a power converting task, and comprising respective first generator-side terminals and respective first network-side terminals, wherein the first generator-side terminals are electrically connected with the wind power generator, and the first network-side terminals are electrically connected with corresponding secondary windings of plural secondary windings of the isolating transformer; and a second converting circuit comprising plural second generator-side terminals and a second network-side terminal, wherein the second network-side terminal is electrically connected with a corresponding secondary winding of the plural secondary windings of the isolating transformer, and the second generator-side terminals are serially connected with the corresponding first generator-side terminals of the first converting circuits and electrically connected with the wind power generator through the first converting circuits, wherein the second converting circuit is selectively operated in a non-crowbar mode or in a crowbar mode, wherein when the second converting circuit is operated in a non-crowbar mode, the second converting circuit performs the power converting task so that the power converting task of the plural first converting circuits is shared by the second converting circuit.

2. The wind power conversion system according to claim 1, wherein the wind power generator is operated at a voltage level of 1 KV~10 KV.

3. The wind power conversion system according to claim 1, wherein the wind power generator comprises three phase windings, and the first generator-side terminals of the first converting circuits are electrically connected with the corresponding phase windings.

4. The wind power conversion system according to claim 3, wherein if a phase voltage of one phase winding of the wind power generator is higher than the maximum output voltage of the corresponding first generator-side terminal of the first converting circuit, the second converting circuit is operated in the non-crowbar mode, wherein in the non-crowbar mode, the second converting circuit is enabled to share the power converting task.

5. The wind power conversion system according to claim 3, wherein if a phase voltage of each phase winding of the wind power generator is lower than or equal to the maximum output voltage of the corresponding first generator-side terminal of the first converting circuit, the second converting circuit is operated in the crowbar mode, wherein in the crowbar mode, the second converting circuit is short-circuited.

6. The wind power conversion system according to claim 3, wherein each of the first converting circuits is a three phase to single phase converting circuit and has an AC/DC/AC circuitry configuration.

7. The wind power conversion system according to claim 6, wherein the second converting circuit is a three phase to three phase converting circuit and has an AC/DC/AC circuitry configuration.

8. The wind power conversion system according to claim 7, wherein each of the first converting circuits comprises a first generator-side converter with two bridge arms.

9. The wind power conversion system according to claim 8, wherein the second converting circuit comprises a second generator-side converter with three bridge arms.

10. The wind power conversion system according to claim 9, wherein the first generator-side converter of each first converting circuit and the second generator-side converter of the second converting circuit are controlled by a sinusoidal pulse width modulation method based on a carrier phase-shifting technique, wherein if the second converting circuit is operated in the non-crowbar mode, phase shift angles among carrier waves of the two bridge arms of the first generator-side converter of the first converting circuit and the corresponding bridge arm of the second converting circuit are 120°.

11. The wind power conversion system according to claim 9, wherein the first generator-side converter of each first converting circuit is controlled by a sinusoidal pulse width modulation method based on a carrier phase-shifting technique, wherein if the second converting circuit is operated in the crowbar mode, a phase shift angle between carrier waves of the two bridge arms of the first generator-side converter of the first converting circuit is 180°.

12. The wind power conversion system according to claim 6, wherein the second converting circuit is a three phase to three phase converting circuit and has an AC/AC circuitry configuration.

13. The wind power conversion system according to claim 12, wherein each of the first converting circuits comprises a first generator-side converter with two bridge arms, wherein the first generator-side converter of each first converting circuit is controlled by a sinusoidal pulse width modulation method based on a carrier phase-shifting technique, and a phase shift angle between carrier waves of the two bridge arms of the first generator-side converter of the first converting circuit is 180°.

14. The wind power conversion system according to claim 12, wherein the second converting circuit is a two stage matrix converting circuit.

15. The wind power conversion system according to claim 12, wherein the second converting circuit is a conventional matrix converting circuit.

16. The wind power conversion system according to claim 3, wherein the first converting circuits and the second converting circuits have two-level circuitry configurations.

17. The wind power conversion system according to claim 3, wherein the first converting circuits and the second converting circuits have three-level circuitry configurations.

18. The wind power conversion system according to claim 3, wherein each of the first converting circuits is a three phase to single phase converting circuit and has an AC/AC circuitry configuration.

19. The wind power conversion system according to claim 18, wherein the first converting circuit is a three phase to single phase matrix converting circuit.

20. The wind power conversion system according to claim 1, wherein the number of the plural secondary windings of the isolating transformer is equal to the total number of the plural first converting circuits and the second converting circuit, wherein the plural first converting circuits comprise three first converting circuits, and the isolating transformer comprises four secondary windings.

* * * * *